UNITED STATES PATENT OFFICE.

WILLIAM HOSKINS, OF LA GRANGE, AND WILLIAM A. SPINKS, OF CHICAGO, ILLINOIS.

SUBSTITUTE FOR BILLIARD-CHALK.

SPECIFICATION forming part of Letters Patent No. 578,514, dated March 9, 1897.

Application filed February 4, 1896. Serial No. 578,043. (No specimens.)

*To all whom it may concern:*

Be it known that we, WILLIAM HOSKINS, residing at La Grange, and WILLIAM A. SPINKS, residing at Chicago, in the county of Cook, State of Illinois, citizens of the United States, have invented a new and useful Improvement in a Substitute for Billiard-Chalk, of which the following is a specification.

Our invention relates to an improved substitute for billiard-chalk. Heretofore it has been the universal practice, so far as we know, to apply to the tip-leather of a billiard-cue chalk or carbonate of lime for the purpose of preventing the tip from slipping off the ivory ball when impact is produced. The chalk is usually formed into cubes and applied by a gentle grinding upon the surface of the tip, the characteristics of the material being such as to cause it to adhere more or less temporarily to the leather, and by reason of being slightly harder than the ivory and considerably harder and more abrasive than the leather surface to grip or bind upon the ivory under impact. We have found that superior results in many respects are obtained where, instead of chalk or other form of carbonate, pulverulent and compacted silica or an equivalent therefor is employed. While many silicates having a frictional property and capable of being pulverized and compacted are capable of use in carrying out our invention and are included therein, whether used alone or in combination with other substances or even in association with carbonates, we prefer to employ a commercially-pure silica associated only with a small percentage of binding material, such as glue, and in some instances associated with a small percentage of corundum or other gritty material, an example of which is found in emery-powder.

Our invention, broadly stated, therefore consists in a substitute for billiard-chalk comprising compacted pulverulent silica or an equivalent therefor having frictional property and compacted in the form adapting it for application to the tip of a billiard-cue in the same manner that chalk is applied. The silica or its equivalent may be otherwise than powdered preliminary to forming it into a cake or block, but it is essential that the silica or its equivalent employed shall be one capable of ready reduction to a powder after being formed into a cake or block.

Our invention further consists in a substitute for billiard-chalk in the form of a composition of a pulverulent silica or an equivalent therefor having frictional property, together with a small percentage of binding substance, such as glue, the mass being compacted into a cake or block.

Our invention further consists in a composition affording a substitute for billiard-chalk composed of pulverulent silica or an equivalent therefor with a binding material, such as glue, and a roughening material, such as corundum.

Our invention consists, further, of a composition affording a substitute for billiard-chalk composed of pulverulent silica or an equivalent therefor, a coloring substance, such as chrome-green, with or without corundum, and with a binding material, such as glue.

Our invention consists, finally, in a substitute for billiard-chalk comprising compacted pulverulent silica or its equivalent with a binding material in the form of a cake or block.

To carry out our invention, we prefer to employ commercially-pure silica, which can be easily obtained in large quantities and in a pulverulent or readily-pulverized form. While the purity of the substance necessarily varies, it will ordinarily approximate from eighty to eighty-five per cent. of pure silica, although a greater percentage of impurities will not render the substance much less useful for our purpose. The silica thus obtained is sifted and ground to a fine powder, mixed with a small percentage of liquid glue and a small percentage of corundum, (emery-powder being usually the most available form,) and a small percentage of coloring agent, chrome-green being more commonly selected, although this may be changed or omitted according to the election of the manufacturer, and the mass, thoroughly stirred, is thereupon placed in molds and firmly compacted. When dry, it is at once ready for use. It is found that the substitute for billiard-chalk thus produced has superior advantages over the carbonate of lime or magnesia. It adheres more tenaciously to the leather of a tip, so that when freed, as the necessary result of impact upon the ball, a very much smaller percentage of the dry coating leaves the cue-tip, and, on the other hand, owing perhaps to the peculiar nature of the silica or its equivalent in this connection, it seems to attack the ivory of the ball with greater firmness with the result that the ball may be struck much nearer to the side without danger of the cue slipping than is the case with the chalk for which this affords a substitute. It is possible, as with the case of ordinary chalk, so to color the substitute that no mark will be left upon the cloth as it falls from the cue-tip, but we prefer to give to the substitute a color which may render its presence on the cloth of the table to be readily observed, as it may thus be more readily removed.

The percentage of binding material where, as preferred, it is used is dependent upon the amount of hardness which it is desired that the substitute for chalk shall possess. For obvious reasons we deem it more desirable to employ as little binding material as possible. The corundum, when used, is employed solely for the purpose of roughening the tip of the billiard-cue and may be dispensed with when the leather employed is such as to make roughening unnecessary or where roughening is for other reasons not desired.

What we claim as new, and desire to secure by Letters Patent, is—

1. A substitute for billiard-chalk composed of pulverized silica or its equivalent, and a binding agent compacted into blocks or cakes, substantially as described.

2. A substitute for billiard-chalk composed of normally white pulverized silica, a binding agent and a coloring agent, compacted into blocks or cakes, substantially as described.

3. A substitute for billiard-chalk composed of pulverized silica, corundum, a binding agent and a coloring agent, such as chrome-green, the whole being compacted into cakes or blocks, substantially as described.

WILLIAM HOSKINS.
WILLIAM A. SPINKS.

In presence of—
J. N. HANSON,
J. H. LEE.